United States Patent
Deshpande et al.

(10) Patent No.: US 10,460,336 B2
(45) Date of Patent: Oct. 29, 2019

(54) INCENTIVIZING ADOPTION OF PREDEFINED PRACTICES USING DIGITAL TRANSACTABLE ASSETS

(71) Applicant: International Business Machines Corporation, Armonk, NY (US)

(72) Inventors: Pralhad Deshpande, Bangalore (IN); Ravindranath Kokku, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 949 days.

(21) Appl. No.: 14/961,137

(22) Filed: Dec. 7, 2015

(65) Prior Publication Data

US 2017/0161763 A1  Jun. 8, 2017

(51) Int. Cl.
*G06Q 30/02* (2012.01)

(52) U.S. Cl.
CPC .............................. *G06Q 30/0207* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 2010/0076835 A1* | 3/2010 | Silverman | G06Q 10/06 705/14.33 |
| 2010/0121700 A1 | 5/2010 | Wigder et al. | |
| 2012/0224504 A1 | 9/2012 | Wasserman | |
| 2012/0296799 A1 | 11/2012 | Playfair et al. | |
| 2012/0316933 A1 | 12/2012 | Pentland et al. | |
| 2013/0332327 A1 | 12/2013 | Sgouridis et al. | |
| 2016/0371716 A1* | 12/2016 | Aitenbichler | G06Q 30/0233 |

FOREIGN PATENT DOCUMENTS

WO    2014137476 A1    9/2014

OTHER PUBLICATIONS

SolarCoin Wiki, http://wiki.solarcoin.org/index.php?title=Main_Page&oldid=6243, Nov. 26, 2014.
GreenCoin Foundation, GreenCoin, http://www.grcoin.com/GreenCoin-Abstract_v1.0.pdf, Jun. 2, 2014.
Mihaylov et al., NRG-X-Change: A Novel Mechanism for Trading of Renewable Energy in Smart Grids, Apr. 2014.

* cited by examiner

*Primary Examiner* — Patricia H Munson
(74) *Attorney, Agent, or Firm* — Ryan, Mason & Lewis, LLP

(57) ABSTRACT

Methods, systems, and computer program products for incentivizing adoption of predefined practices using digital transactable assets are provided herein. A computer-implemented method includes processing measurements from a collection of activity meters over a predetermined period of time, wherein each of the activity meters is linked to at least one user, and wherein the measurements represent user activity in furtherance of a predefined objective; generating units of a digital transactable asset to be allocated among the users in connection with the predefined objective; allocating the generated units of the digital transactable asset among the users based on said processing; and converting the generated units of the digital transactable asset allocated to each of the users to an alternative value source upon completion of (i) the predefined objective and/or (ii) the predetermined period of time.

18 Claims, 6 Drawing Sheets

INCENTIVIZING ADOPTION OF PREDEFINED PRACTICES USING DIGITAL TRANSACTABLE ASSETS

FIELD

The present application generally relates to information technology, and, more particularly, to incentivizing techniques.

BACKGROUND

Environmentally-related practices, such as installing rooftop solar panels and driving electric cars, face barriers to user-adoption ranging from financial issues to user experience issues. A need exists, therefore, for techniques to efficiently incentivize user-adoption of certain practices within one or more contexts.

SUMMARY

In one embodiment of the present invention, techniques for incentivizing adoption of predefined practices using digital transactable assets are provided. An exemplary computer-implemented method can include steps of processing measurements from a collection of activity meters over a predetermined period of time, wherein each of the activity meters is linked to at least one user, and wherein the measurements represent user activity in furtherance of a predefined objective; generating units of a digital transactable asset to be allocated among the users in connection with the predefined objective; allocating the generated units of the digital transactable asset among the users based on the processing step; and converting the generated units of the digital transactable asset allocated to each of the users to an alternative value source upon completion of (i) the predefined objective and/or (ii) the predetermined period of time.

In another embodiment of the invention, an exemplary computer-implemented method can include steps of surveying an activity meter at a predefined interval to determine when a predetermined activity threshold is reached, wherein the activity meter is (i) linked to a user and (ii) registered with a digital transactable asset authority in connection with a predefined objective pertaining to the activity; signing a meter reading from the activity meter with a private key upon reaching the predetermined activity threshold; and securely communicating the signed meter reading from the activity meter to the digital transactable asset authority, wherein the signed meter reading represents a level of activity by the user linked to the activity meter in furtherance of the predefined objective.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes techniques for incentivizing adoption of predefined practices using digital transactable assets (DTAs). At least one embodiment of the invention includes allocating DTAs across multiple users based on the current state of goals and/or objectives to be achieved in order to incentivize adoption of one or more desired practices. Additionally, one or more embodiments of the invention can include obtaining and/or receiving proof-of-work measurements from one or more sub-systems using tamper resistant smart meters, and reporting such measurements to a DTA authority when pre-determined thresholds are reached.

As also detailed herein, at least one embodiment of the invention can include creating units of DTA, for example, by a central authority, at a rate that is periodically adjusted by the central authority based on the progress towards a desired goal (as a function of non-renewable energy sources, for instance). Additionally, one or more embodiments of the invention can include enabling users to regulate the currency value of DTAs. For example, the fraction of a total goal achieved by all users can be used to determine the monetary value of a DTA unit at the end of a disbursement period. Also, for example, DTA units can have a lower bound for monetary value during the period of disbursement, and after the period of disbursement, a fixed value can be determined and utilized.

As used and described herein in connection with one or more embodiments of the invention, a DTA is an Internet-based medium of exchange that is limited in quantity and is transactable in a peer-to-peer fashion. Such discovered and/or created units of DTA can be awarded to individuals that provide proof-of-work measurements of a desired practice that contributes to a desired goal related to that practice. Accordingly, in at least one embodiment of the invention, the desirable and/or predetermined practice that is chosen for promotion should be such that it can be measured using a tamper resistant meter and/or sensor. Further, as noted above, the value of DTA is not determined by any authority, but can be determined by its users while trading the DTAs in a peer-to-peer manner or on exchange platforms. Additionally, in one or more embodiments of the invention, a DTA can acquire monetary value when the desired goal is achieved.

Figure 1:
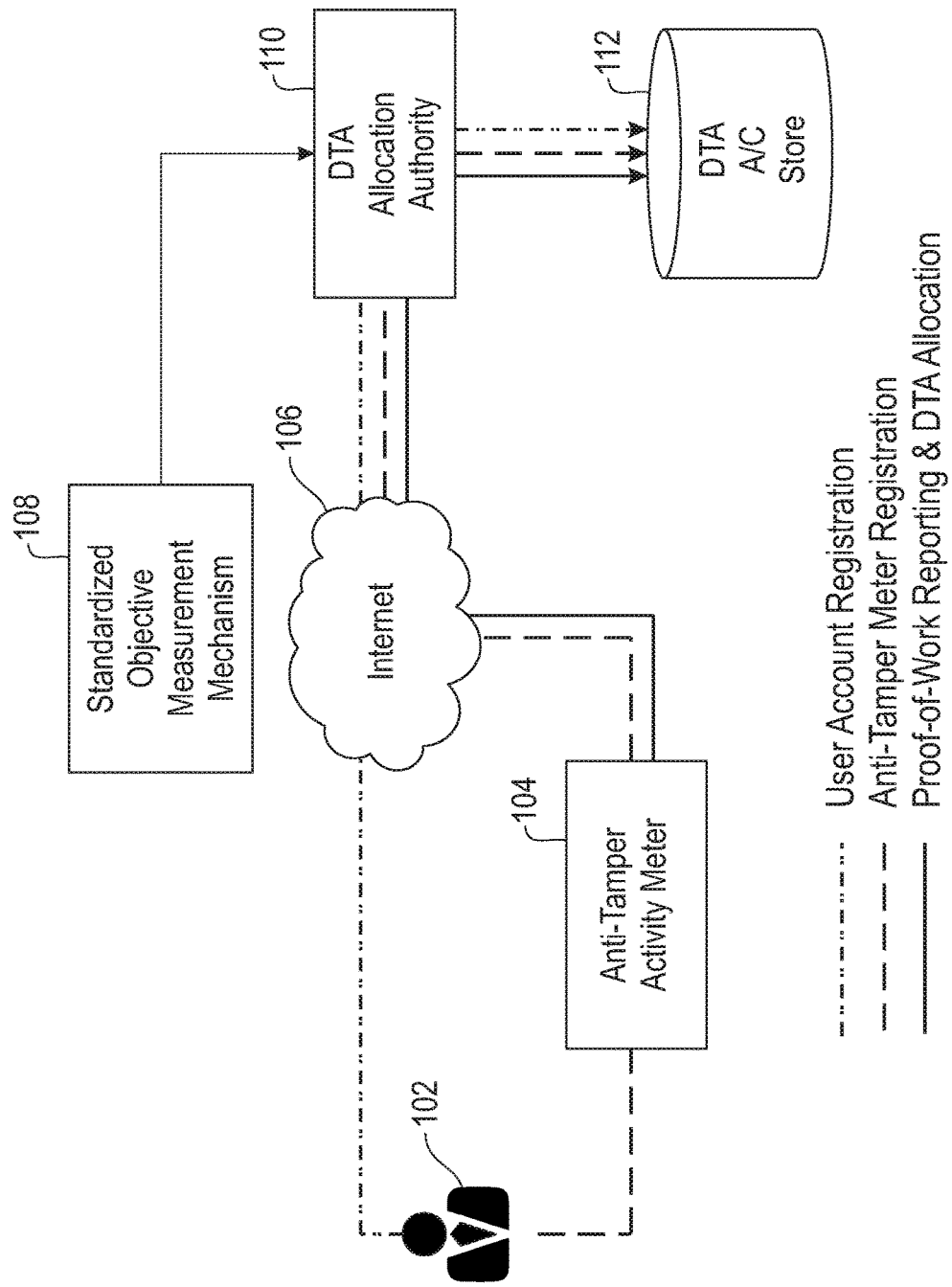
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a user 102, an anti-tamper activity meter 104, the Internet 106, a standardized objective measurement mechanism 108, a DTA allocation authority 110, and a DTA accounts (A/C) store 112. As detailed herein, the anti-tamper activity meter 104 can be obtained by and/or provided to the user 102 (who wants to participate in the DTA activity). The meter 104 reacts to preset thresholds and reports measurements related thereto to the DTA allocation authority 110 via the Internet 106.

The DTA allocation authority 110 accepts account registrations from users (such as 102) who want to possess DTA units, and also accepts registration of anti-tamper activity meters (such as 104) from users who want to participate in exchanging DTA units. The DTA allocation authority 110 can periodically generate new units of DTA, and can also periodically adjust the rate of generation of DTA units based on input from the standardized objective measurement mechanism 108. Further, as detailed herein, the DTA allocation authority 110 allocates units of DTA to users whose meters show proof-of-work measurements.

As also depicted in FIG. 1, the DTA accounts store 112 maintains information pertaining to users (such as 102) and the DTA account balances corresponding to such users. Additionally, the standardized objective measurement mechanism 108 measures the current state of the objective to be achieved. The cumulative goal to be achieved by all participants is known in advance. Individual anti-tamper activity meters (such as component 104 in FIG. 1) report their measurements, and the current state of the global goal to be achieved can be computed from these measurements.

Figure 2:
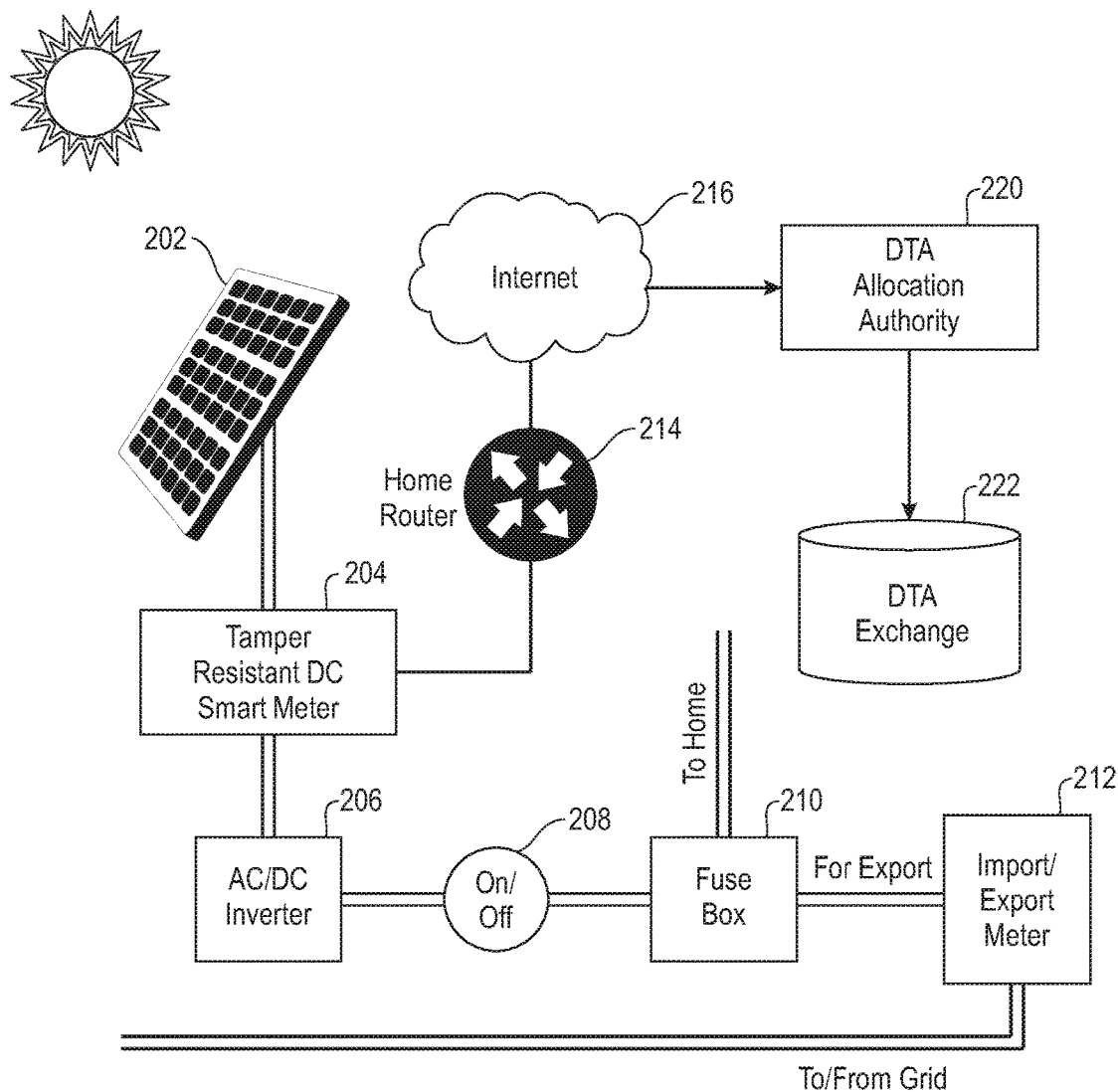
FIG. 2 is a diagram illustrating system architecture, according to an exemplary embodiment of the invention.

FIG. 2 is a diagram illustrating system architecture, according to an example embodiment of the invention. By way of illustration, FIG. 2 depicts architecture to leverage DTAs to incentivize roof-top installations of solar panels. Specifically, direct current (DC) electricity generated by a roof-top installation 202 is measured by a tamper resistant DC smart meter 204. The DC electricity is then converted to alternating current (AC) by a DC/AC inverter 206. This feed is then given to the user's and/or home (and/or building) owner's fuse box 210, which supplies electricity to the home and/or building. Also, on/off component 208 turns the solar roof installation on/off.

The excess electricity is pumped in the public grid via an import/export meter 212. In an example scenario, for example, the import/export meter 212 can spin backwards. The import/export meter 212 measures how much power has been consumed subtracted by the amount of energy produced. When, in one example, a user is producing more energy than the user is consuming, and the excess energy is being pumped to the grid, the corresponding import/export meter spins backwards, reducing that user's energy bill. In case the home and/or building needs more electricity than supplied by the solar installation 202 (such as, for example, during night times), excess electricity is drawn from the grid via the import/export meter 212. In such an instance, the meter 212 spins forward.

As noted above, the tamper resistant smart meter 204 measures the amount of DC electricity produced by the solar panels 202. Upon hitting one or more predetermined thresholds (for example, each customer's meter reports generation of 1 kilowatt (KW)), the meter reading is conveyed to the DTA allocation authority 220 over a secure communication channel via a router 214 and the Internet 216. In accordance with one or more embodiments of the invention, such conveyance includes a proof-of-work measurement, as performed by the solar panels 202, being reported to the DTA allocation authority 220.

As similarly described herein in connection with one or more alternative contexts, the DTA allocation authority 220 can periodically generate units of DTA, and the rate of generation of DTAs can be a function of the annual consumption of non-renewable energy sources. Also, the DTA allocation authority 220 can divide the generated units among users whose meters have successfully reported the proof-of-work in a given time period. Further, in one or more embodiments of the invention, the DTA allocation authority 220 can accept produced electricity only if there is demand. At the end of a goal and a related timeframe (for example, 100 gigawatts (GW) produced within 10 years), the units can convert into money. Additionally, holders of DTA units can exchange such units for a given type of currency or other tradable instruments of value at a DTA exchange 222.

Figure 3:
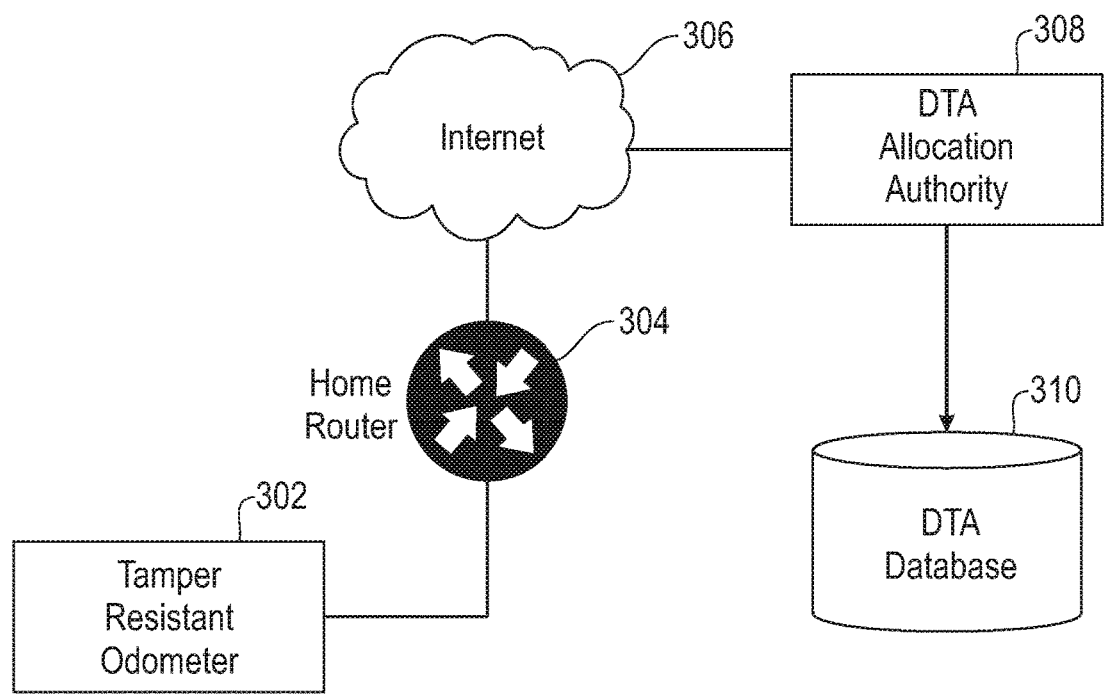
FIG. 3 is a diagram illustrating system architecture, according to an exemplary embodiment of the invention.

FIG. 3 is a diagram illustrating system architecture, according to an example embodiment of the invention. By way of illustration, FIG. 3 depicts architecture to leverage DTAs to incentivize electric vehicle usage. Specifically, an anti-tamper meter (such as an odometer) 302 in an electric vehicle measures miles driven, and reports proof-of-work measurements at predefined thresholds via a router 304 and the Internet 306 to a DTA allocation authority 308. By way of example, each customer's meter (such as 302) can report driving of 10 miles to the DTA allocation authority 308. The DTA allocation authority 308 allocates units of DTA to those users showing proof-of-work. Additionally, a DTA database 310 maintains the list of participating users and the number of DTA units held by such users, via entries such as, for example, <user_id, total_DTA_units_held>.

Additionally, at least one embodiment of the invention can include incorporating one or more systems to detect abuse such as, for example, unnecessary overuse of an electric vehicle to inflate miles counts. Further, as similarly noted herein, at the end of a goal and a given timeframe (for example, 10 billion miles driven collectively within 10 years), the units can convert into money.

By way of illustration, at least one embodiment of the invention can include using the following terms and variables:

G=total work to be done (in furtherance of a desired goal, for example);
G(t)=aggregate work done until/up to time period t;
N=maximum number of DTA units that can be awarded;
w=a unit of work;
G=wN (Work is broken into N units, and 1 DTA unit is awarded for each unit of work);
T=time at which the awarded DTA units convert to monetary value;
R(t)=Reward for each DTA unit at time period t (a monotonically increasing function). By way of example, consider a cubic function such as $R(t)=(M/N)(G(t)/G)^3$ when $G(t) \leq G$, 0 otherwise;
$N_t$=maximum DTA units disbursed per unit time=$D_t/w$, where $D_t$ is current demand; and
M=maximum monetary corpus that can be awarded.

Additionally, one or more embodiments of the invention include incorporating goal-driven incentives. In such an embodiment, the choice of a function can be weighted such that reaching the goal is more valuable than falling short of the goal. The function can be monotonically increasing such that work done is always rewarded and the future value of work already done does not decrease. By way of example, consider the following: $0 \leq R(t) \leq M/N$, which indicates that the monetary reward for each unit of DTA at time $t<T$ is in the range $[0, M/N]$).

Also, one or more embodiments of the invention include incorporating progress-driven rewards. In such an embodiment, a reward for each unit of DTA increases when more work is done. Such an implementation can be carried out, for example, by definition of the reward function as a function of the fraction of the goal achieved.

Further, at least one embodiment of the invention can also include encouraging early collection and/or participation by users. As the number of participants increases, the chance of exhausting DTA units in an interval of time also increases. Encouraging additional users to participate can drive up the fraction of the goal reached, and hence, the reward (as $R_t$ is monotonically increasing).

As detailed herein, an anti-tamper activity meter (such as component 104 in FIG. 1, component 204 in FIG. 2, and component 302 in FIG. 3, for example) can report proof-of-work by generating and outputting (to the DTA allocation authority) meter readings digitally signed by the anti-tamper activity meter's private key. In such an embodiment, each party/entity of a communication/transaction (such as an anti-tamper activity meter and a DTA allocation authority, for example) holds a public key and a private key. The public key is known to all concerned and the private key is held secretly by the given party. When a sender signs a message with the private key, others can determine the identity of the sender via knowledge of the sender's public key.

As detailed below (and further herein), such an output can be generated based on input of unit measures of work (w). In generating such an output, an initial measure of proofs submitted=0. Subsequently, at least one embodiment of the invention includes reading the activity meter, and if integer (meter_reading/w)>proofs_submitted, then the meter reading is signed with the meter's private key. In one or more embodiments of the invention, the anti-tamper activity meter measures activity continuously. Once the current unreported amount of activity crosses a certain threshold (w in the example equation noted above), the meter sends the signed meter reading as proof to the DTA allocation authority. The meter also maintains a measure of the total number of proofs submitted. Additionally, the signed meter reading can be sent as proof-of-work to the DTA allocation authority. Further iterations of the above sequence of steps can be carried out, and the submitted proofs can be incremented.

As also detailed herein, a DTA allocation authority can allocate DTA based on inputs of (i) the total number of DTA units (N), (ii) a unit of work (w), (iii) the time at which DTA units convert to monetary value (T), (iv) the current time period (t), (v) a monotonically increasing reward function (R), (vi) current demand ($D_i$), and (vii) the amount of the goal reached at time t (G(t)). Using such inputs, the DTA allocation authority can generate an output of one or more updates to be applied to the account balances of users in the DTA account store who have submitted proofs-of-work in the current time period.

As detailed below (and further herein), such an output can be generated based on the total work to be done (G=wN) in furtherance of the objective in question. If (G(t)≥G OR t≥T) (that is, the goal is reached OR the time period is over), at least one embodiment of the invention includes converting relevant DTA units into monetary value in the DTA account store. As noted herein, the maximum amount of DTA units that can be allocated in the time period t can be represented as $N_t=D_t/w$. By way of example, for the first $N_t$ submissions of proofs-of-work, at least one embodiment of the invention can include allocating a DTA unit per submission to the owner of the meter providing the proof-of-work.

Also, at any time period t, the reward function R(t) can return the monetary value of a DTA unit if no additional work is done. This is the minimum value that a DTA unit may have. Additionally, M/N is the maximum value that a DTA unit may have at any time. In one or more embodiments of the invention, DTA units can be traded on a DTA exchange platform (such as depicted via component 222 in FIG. 2). Traders can be permitted to speculate, for example, on the monetary value that each DTA unit will acquire at time T. In such an embodiment, the instantaneous value of each DTA unit can thus be a function of optimism or pessimism of the trading population as a whole towards achieving the end goal.

Figure 4:
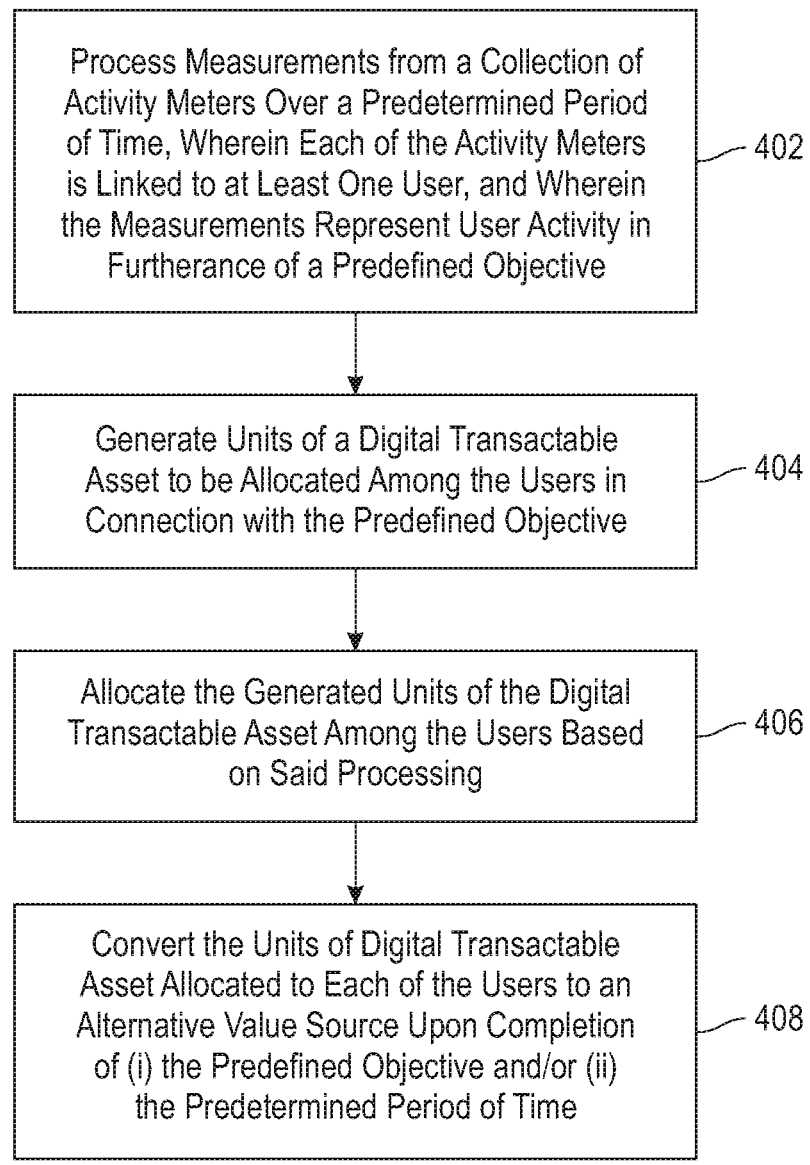
FIG. 4 is a flow diagram illustrating techniques according to an embodiment of the invention.

FIG. 4 is a flow diagram illustrating techniques according to an embodiment of the present invention. Step 402 includes processing measurements from a collection of activity meters over a predetermined period of time, wherein each of the activity meters is linked to at least one user, and wherein the measurements represent user activity in furtherance of a predefined objective. The predefined objective can include, for example, an objective pertaining to usage of a renewable energy source.

Step 404 includes generating units of a digital transactable asset to be allocated among the users in connection with the predefined objective. The digital transactable assets can include an Internet-based medium of exchange. Also, the generating step can include generating units of the digital transactable asset at an adjustable rate of frequency, wherein the adjustable rate of frequency can be based on a level of progress towards the predefined objective.

Step 406 includes allocating the generated units of the digital transactable asset among the users based on said processing. Allocating can include applying an update to an account balance of each of the users based on said processing.

Step 408 includes converting the generated units of the digital transactable asset allocated to each of the users to an alternative value source upon completion of (i) the predefined objective and/or (ii) the predetermined period of time. The value of the alternative value source can be based on a percentage of the predefined objective achieved by the users. By way of example, the alternative value source can include monetary value.

The techniques depicted in FIG. 4 can also include determining a percentage of the predefined objective achieved by the users at a given point during the predetermined period of time. Further, the techniques depicted in FIG. 4 can include registering each of the users as participating toward the predefined objective as well as registering each of the activity meters as participating toward the predefined objective.

Figure 5:
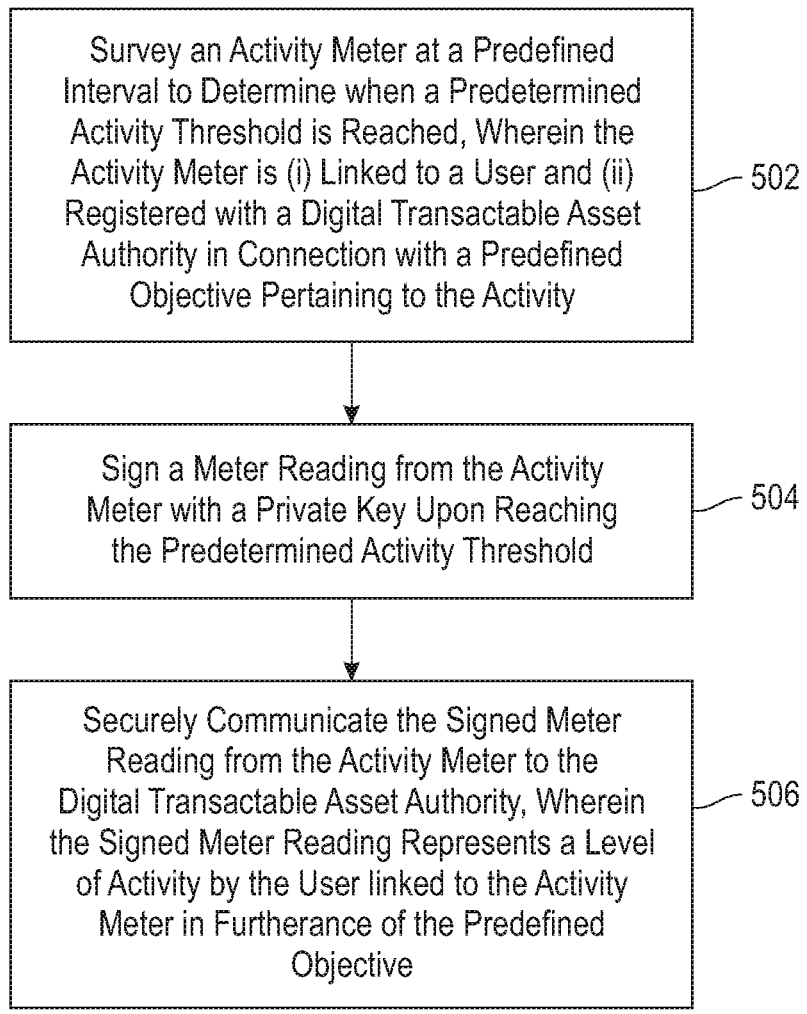
FIG. 5 is a flow diagram illustrating techniques according to an embodiment of the invention.

FIG. 5 is a flow diagram illustrating techniques according to an embodiment of the present invention. Step 502 includes surveying an activity meter at a predefined interval to determine when a predetermined activity threshold is reached, wherein the activity meter is (i) linked to a user and (ii) registered with a digital transactable asset authority in connection with a predefined objective pertaining to the activity. Step 504 includes signing a meter reading from the activity meter with a private key upon reaching the predetermined activity threshold. Step 506 includes securely communicating the signed meter reading from the activity meter to the digital transactable asset authority, wherein the signed meter reading represents a level of activity by the user linked to the activity meter in furtherance of the predefined objective.

At least one embodiment of the invention (such as the techniques depicted in FIG. 4 and FIG. 5, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives energy activity information sent from a data source to the transmission server. The server can process the information, for example, based upon user-provided user preference information and/or DTA allocation authority parameters that are stored in memory on the server. Subsequently, an alert is generated containing DTA allocation information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 4 and FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 and FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
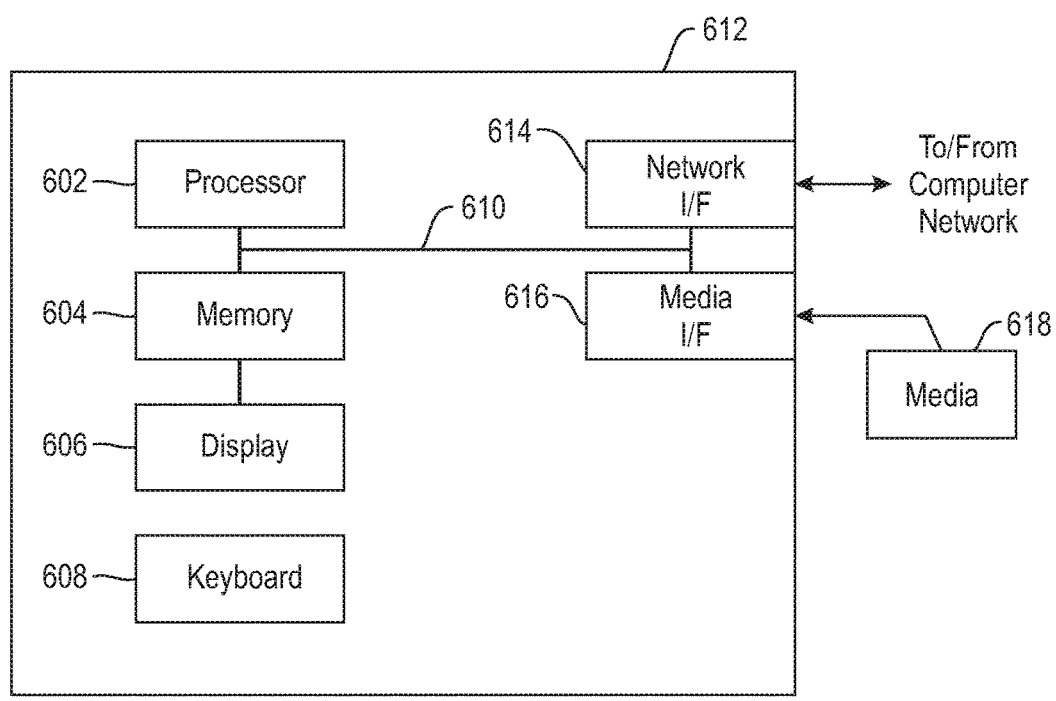
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing to state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, creating units of DTA via a central authority at a rate that is periodically adjusted by the central authority based on progress towards a desired goal.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    measuring, by multiple tamper-resistance activity meters over a pre-determined period of time, proof-of-work measurements of one or more user activities in furtherance of a predefined objective, wherein the predefined objective comprises usage of a renewable energy source, and wherein the proof-of-work measurements comprise one or more of power consumption values and power production values:
    collecting, via the multiple tamper-resistant activity meters, the proof-of-work measurements; processing the proof-of-work measurements from the multiple tamper-resistant activity meters, wherein each of the multiple tamper-resistant activity meters is linked to at least one user;
    generating units of a digital transactable asset to be allocated among the users in connection with the predefined objective;
    allocating the generated units of the digital transactable asset among the users based at least in part on (i) said processing, (ii) the total number of digital transactable asset units, (iii) the time at which the digital transactable asset units convert to an alternative value source, (iv) the predetermined period of time, (v) a monotonically increasing reward function, (vi) current digital transactable asset demand, and (vii) the amount of the predefined objective reached at the time of allocation, wherein the monotonically increasing reward function comprises $R(t) = (M/N)(G(t)/G)^3$ when $G(t) \leq G$, and 0 otherwise, wherein $R(t)$ represents a reward for each digital transactable asset unit at time period t, M represents a maximum monetary corpus that can be awarded, N represents a maximum number of digital transactable asset units that can be awarded, and $G(t)$ represents aggregate work done up to time period t; and
    converting the generated units of the digital transactable asset allocated to each of the users to the alternative value source upon completion of (i) the predefined objective and/or (ii) the predetermined period of time;
    wherein the steps are carried out by at least one computing device.

2. The computer-implemented method of claim 1, wherein said generating comprises generating units of the digital transactable asset at an adjustable rate of frequency.

3. The computer-implemented method of claim 2, wherein the adjustable rate of frequency is based on a level of progress towards the predefined objective.

4. The computer-implemented method of claim 1, wherein said allocating comprises applying an update to an account balance of each of the users based on said processing.

5. The computer-implemented method of claim 1, wherein the value of the alternative value source is based on a percentage of the predefined objective achieved by the users.

6. The computer-implemented method of claim 1, wherein the digital transactable assets comprises an Internet-based medium of exchange.

7. The computer-implemented method of claim 1, comprising:
    determining a percentage of the predefined objective achieved by the users at a given point during the predetermined period of time.

8. The computer-implemented method of claim 1, comprising:
    registering each of the users as participating toward the predefined objective.

9. The computer-implemented method of claim 1, comprising:
    registering each of the multiple tamper-resistant activity meters as participating toward the predefined objective.

10. A computer program product comprising a computer readable storage medium having program instructions embodied therewith, the program instructions executable by a device to cause the device to:
    measure, by multiple tamper-resistance activity meters over a pre-determined period of time, proof-of-work measurements of one or more user activities in furtherance of a predefined objective, wherein the predefined objective comprises usage of a renewable energy source, and wherein the proof-of-work measurements comprise one or more of power consumption values and power production values:
    collect, via the multiple tamper-resistant activity meters, the proof-of-work measurements;

process the proof-of-work measurements from the multiple tamper-resistant activity meters, wherein each of the multiple tamper-resistant activity meters is linked to at least one user;

generate units of a digital transactable asset to be allocated among the registered users in connection with the predefined objective;

allocate the generated units of the digital transactable asset among the users based at least in part on (i) said processing, (ii) the total number of digital transactable asset units, (iii) the time at which the digital transactable asset units convert to an alternative value source, (iv) the predetermined period of time, (v) a monotonically increasing reward function, (vi) current digital transactable asset demand, and (vii) the amount of the predefined objective reached at the time of allocation, wherein the monotonically increasing reward function comprises $R(t) = (M/N)(G(t)/G)^3$ when $G(t) \leq G$, and 0 otherwise, wherein $R(t)$ represents a reward for each digital transactable asset unit at time period t, M represents a maximum monetary corpus that can be awarded, N represents a maximum number of digital transactable asset units that can be awarded, and $G(t)$ represents aggregate work done up to time period t; and convert the generated units of the digital transactable asset allocated to each of the users to the alternative value source upon completion of (i) the predefined objective and/or (ii) the predetermined period of time.

11. The computer program product of claim 10, wherein said generating comprises generating units of the digital transactable asset at an adjustable rate of frequency.

12. The computer program product of claim 11, wherein the adjustable rate of frequency is based on a level of progress towards the predefined objective.

13. The computer program product of claim 10, wherein said allocating comprises applying an update to an account balance of each of the users based on said processing.

14. The computer program product of claim 10, wherein the value of the alternative value source is based on a percentage of the predefined objective achieved by the users.

15. The computer program product of claim 10, wherein the program instructions executable by a computing device further cause the computing device to:

determine a percentage of the predefined objective achieved by the users at a given point during the predetermined period of time.

16. The computer program product of claim 10, wherein the program instructions executable by a computing device further cause the computing device to:

register each of the users as participating toward the predefined objective.

17. The computer program product of claim 10, wherein the program instructions executable by a computing device further cause the computing device to:

register each of the multiple tamper-resistant activity meters as participating toward the predefined objective.

18. A system comprising:

a memory; and at least one processor coupled to the memory and configured for:

measuring, by multiple tamper-resistance activity meters over a pre-determined period of time, proof-of-work measurements of one or more user activities in furtherance of a predefined objective, wherein the predefined objective comprises usage of a renewable energy source, and wherein the proof-of-work measurements comprise one or more of power consumption values and power production values;

collecting, via the multiple tamper-resistant activity meters, the proof-of-work measurements;

processing the proof-of-work measurements from the multiple tamper-resistant activity meters, wherein each of the multiple tamper-resistant activity meters is linked to at least one user;

generating units of a digital transactable asset to be allocated among the registered users in connection with the predefined objective;

allocating the generated units of the digital transactable asset among the users based at least in part on (i) said processing, (ii) the total number of digital transactable asset units, (iii) the time at which the digital transactable asset units convert to an alternative value source, (iv) the predetermined period of time, (v) a monotonically increasing reward function, (vi) current digital transactable asset demand, and (vii) the amount of the predefined objective reached at the time of allocation, wherein the monotonically increasing reward function comprises $R(t) = (M/N)(G(t)/G)^3$ when $G(t) \leq G$, and 0 otherwise, wherein $R(t)$ represents a reward for each digital transactable asset unit at time period t, M represents a maximum monetary corpus that can be awarded, N represents a maximum number of digital transactable asset units that can be awarded, and $G(t)$ represents aggregate work done up to time period t; and converting the generated units of the digital transactable asset allocated to each of the users to the alternative value source upon completion of (i) the predefined objective and/or (ii) the predetermined period of time.

* * * * *